(12) United States Patent
Mihara et al.

(10) Patent No.: US 6,984,543 B2
(45) Date of Patent: Jan. 10, 2006

(54) METHOD OF PRODUCING LAMINATED PTC THERMISTOR

(75) Inventors: Kenjirou Mihara, Yokaichi (JP); Atsushi Kishimoto, Omihachiman (JP); Hideaki Niimi, Hikone (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/639,483

(22) Filed: Aug. 13, 2003

(65) Prior Publication Data

US 2004/0033629 A1    Feb. 19, 2004

(30) Foreign Application Priority Data

Aug. 13, 2002 (JP) .............................. 2002-236075
Jul. 9, 2003 (JP) .............................. 2003-194486

(51) Int. Cl.
*H01L 21/00* (2006.01)

(52) U.S. Cl. .......................... 438/55; 438/54; 438/106; 438/238; 438/382

(58) Field of Classification Search ........... 438/54–55, 438/106, 238, 382–385, 795–796
See application file for complete search history.

(56) References Cited

U.S. PATENT DOCUMENTS 5,815,063 A * 9/1998 Goto et al. ............... 338/22 R
6,400,251 B1 * 6/2002 Abe et al. ................. 338/22 R

FOREIGN PATENT DOCUMENTS

| JP | 50-32496 | 3/1975 |
| JP | 04-206603 | 7/1992 |
| JP | 11-233305 | 8/1999 |
| JP | 11-297508 | 10/1999 |
| KR | 2001-0102536 | 11/2001 |

OTHER PUBLICATIONS

Copy of Korean Office Action dated Jun. 17, 2005 (and English translation of same).

* cited by examiner

*Primary Examiner*—George Fourson
*Assistant Examiner*—Thanh V. Pham
(74) *Attorney, Agent, or Firm*—Dickstein, Shapiro, Morin & Oshinsky, LLP.

(57) ABSTRACT

A method of producing a laminated PTC thermistor involves alternately laminating electroconductive pastes to form internal electrodes and ceramic green sheets to form semiconductor ceramic layers with a positive resistance-temperature characteristic to form a laminate, firing the laminate to form a ceramic piece, and forming external electrodes on both of the end-faces of the ceramic piece, and heat-treating the ceramic piece having the external electrodes formed thereon at a temperature between about 60° C. and 200° C.

14 Claims, 1 Drawing Sheet

METHOD OF PRODUCING LAMINATED PTC THERMISTOR

BACKGROUND OF THE INVENTION

Field of the Invention

The present invention relates to a method of producing a laminated PTC thermistor which has a positive resistance-temperature characteristic and is useful in protection of overcurrent, control of temperature, degaussing, and so forth.

In recent years, the demand for plane-mounting of electronic parts has increased. Thus, laminated PTC thermistors have been required to be reduced in size and resistance. To meet such requirements, laminated PTC thermistors have been developed. In a laminated PTC thermistor, a ceramic piece is produced in which internal electrodes and semiconductor ceramic layers are alternately laminated to each other, and external electrodes are formed on both of the ends of the ceramic piece so as to be connected to the internal electrodes. With this structure, the thickness of the semiconductor ceramic layers and the internal electrodes can be reduced. Thus, the size of the electronic part can be reduced, and the plane-mounting can be easily performed. The resistance of the ceramic piece can be determined by adjustment of the distance between the internal electrodes. Thus, the dispersion of the resistances of electronic parts, caused by differences between the ceramic pieces thereof, can be eliminated, and the resistances of the electronic parts can be reduced.

Referring to a method of producing such a laminated PTC thermistor according to the related art, electro-conductive paste to form internal electrodes and ceramic green sheets to form semiconductor ceramic layers are alternately laminated to each other in such a manner that the conductive pastes for the internal electrodes are exposed onto one-side end of the ceramic green sheets and fired so as to be integrated with each other. Thereafter, electroconductive pastes to form external electrodes are applied onto both of the ends of the sintered ceramic piece and baked.

However, the following problems are caused: in the case where a base metal such as nickel or the like is used for the internal electrodes, the internal electrodes having a low melting point are ready to be oxidized when the internal electrodes and the semiconductor ceramic layers are laminated and fired to be integrated. Therefore, in the case in which a base metal such as nickel is used for the internal electrodes, the internal electrodes and the semiconductor ceramics are simultaneously fired in a reducing atmosphere so that the internal electrodes are prevented from being oxidized, and thereafter, heat-treated in the atmosphere or an oxidizing atmosphere below the firing temperature so that the PTC characteristic is realized. Thereafter, the external electrodes are formed.

However, the laminated PTC thermistor formed by the above-described method, when it is subjected to a conduction test at room temperature for 1000 hours, shows that the room temperature resistance is remarkably increased with the lapse of time. This time-dependent increase of the resistance, e.g., in an overcurrent protection circuit for which a low resistance is required, causes an increase of power consumption, an increase of a heating value, and the deterioration of the overcurrent protection function.

SUMMARY OF THE INVENTION

In view of the forgoing, it is an object of the present invention to provide a method of producing a laminated PTC thermistor in which internal electrodes and semiconductor ceramic layers are fired in a reducing atmosphere to be integrated with each other, and the integrated piece is reoxidized below the firing temperature to form a ceramic piece, whereby the reliability of the laminated PTC thermistor, specifically, the stability of the time-dependent change of the room temperature resistance are enhanced.

According to the present invention, there is provided a method of producing a laminated PTC thermistor which comprises a first step of alternately laminating electroconductive pastes to form internal electrodes and ceramic green sheets to form semiconductor ceramic layers with a positive resistance-temperature characteristic to form a laminate, a second step of firing the laminate to form a ceramic piece, and forming external electrodes on both of the end-faces of the ceramic piece, and a third step of heat-treating the ceramic piece having the external electrodes formed thereon at a temperature between about 60° C. and 200° C.

According to this method, the time-dependent change ratio of the resistance at room temperature of the laminated PTC thermistor can be stabilized. This stabilization mechanism has not completely been elucidated. It is supposed that strains of grain boundaries which serve to realize the PTC characteristic, caused by firing at high temperature and in the atmosphere, are released due to the temperature-history when applied at a temperature lower than the baking temperature for the external electrodes, so that the time-dependent change of the grain boundaries can be stabilized.

It is required that the semiconductor ceramic layers are made of ceramics having a positive resistance-temperature characteristic. Advantageously, the ceramic layers contain a barium titanate type semiconductor ceramic. Preferably, the conductive paste to form the internal electrodes contains a powder of a base metal, especially, a powder of nickel. However, this is not restrictive.

Preferably, the ceramic piece having the external electrodes formed thereon is heat-treated in the method of making a laminated PTC thermistor at a temperature between about 80° C. and 150° C. in the third step.

According to this method, the time-dependent change ratio of the resistance at room, measured by the at least 1000 hour conduction test of the produced laminated PTC thermistor can be stabilized to be within 5%.

DESCRIPTION OF THE PREFERRED EMBODIMENTS

Figure 1:
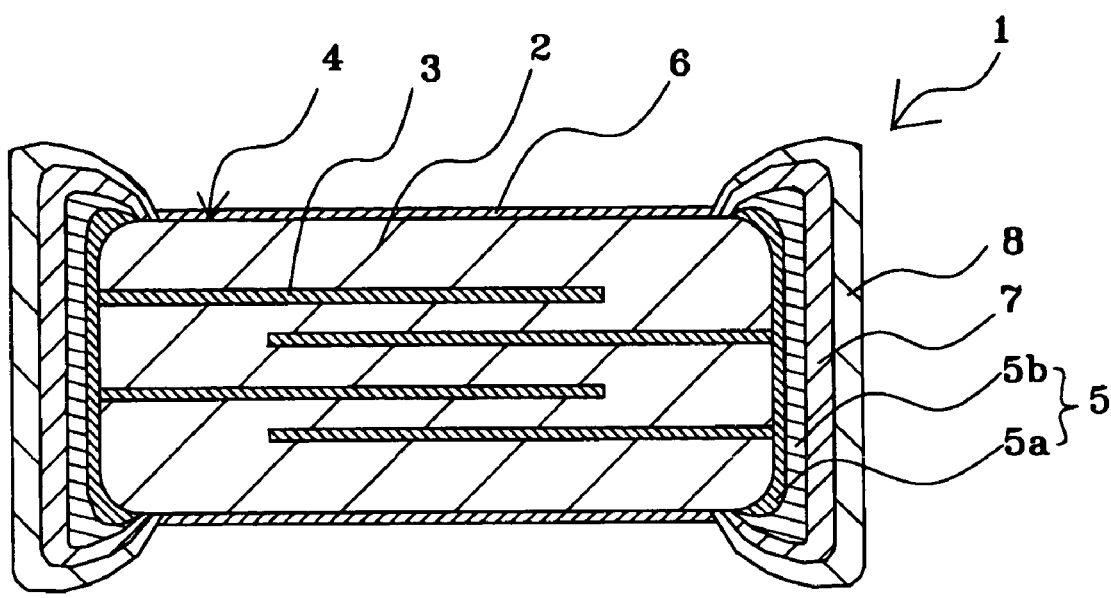
FIG. 1 is a schematic cross-sectional view of a laminated PTC thermistor according to an embodiment of the present invention.

Hereinafter, a method of producing a laminated PTC thermistor will be described with reference to the schematic cross-sectional view of the laminated PTC thermistor shown in FIG. 1.

1. First Process

First, an electroconductive paste to form internal electrodes 3 and ceramic green sheets to form semiconductor ceramic layers 2 are alternately laminated to form a laminate. The ceramic green sheets are prepared by mixing ceramic powder, refined water, and an organic binder to disperse them into slurry, and forming the prepared ceramic slurry into a sheet. For formation of the sheet, preferably, a doctor blade method is employed. A roll coater method, a lift-up method, and so forth may be employed. Preferably, the conductive paste to form the internal electrodes is prepared by mixing an organic binder with a base metal powder of nickel, copper, or the like in an organic solvent such as varnish or the like to disperse them.

Subsequently, preferably, the conductive paste to form the internal electrodes is printed on the surface of a ceramic green sheet in a desired pattern. For the printing, a screen-printing method is preferable. Other printing methods such as gravure printing or the like may be used. Thus, a plurality of the ceramic green sheets each having the paste for the internal electrodes printed thereon are prepared. The ceramic green sheets are overlaid in such a manner that the printed pastes on the ceramic green sheets are opposed to and separated from each other via the respective ceramic green sheets. The laminated ceramic green sheets are cut so that the conductive pastes are exposed on the end-faces of respective formed laminates.

2. Second Process

Next, a laminate formed as described above is fired to form a ceramic piece 4. External electrodes are formed on both of the end-faces of the ceramic piece 4. The second process comprises firing the laminate obtained in the first process, and forming the external electrodes 5 on both of the end-faces of the fired ceramic piece 4. Referring to the firing of the laminate, the laminate is fired in a reducing atmosphere to produce the ceramic piece 4. If a base metal powder of nickel or the like is contained in the internal electrodes 3, and the laminate is fired in the atmosphere or an oxidizing atmosphere, the internal electrodes 4 will be oxidized, so that the room temperature resistance is increased. Thus, the above-described firing in a reducing atmosphere is carried out to prevent the room temperature resistance of the ceramic piece 4 from increasing.

Referring to the formation of the external electrodes 5 on both of the end-faces of the ceramic piece 4, the conductive pastes to form the external electrodes are coated so as to be connected to the internal electrodes 3 exposed on both of the end-faces of the formed ceramic piece 4, and are baked. Thus, the external electrodes 5 are produced. The conductive pastes for the external electrodes are prepared by mixing a conductive powder of silver, palladium, or the like and an organic binder in an organic solvent to disperse them. Referring to a method of forming the external electrodes 5, the following methods may be employed, in addition to the above-described coating and baking of the paste: the ceramic piece 4 is dipped directly in a bath containing the conductive paste for the external electrodes so that both of the end-faces of the ceramic piece 4 are coated with the conductive paste, and then, the paste is dried (heated); and the conductive paste for the external electrodes is screen-printed onto both of the end-faces of the ceramic piece 4, and is dried (heated). As described above, the ceramic piece is heat-treated during the formation of the external electrodes 5. Preferably, this heat treatment is carried out so as to perform the reoxidation of the ceramic piece 4.

In the above-described example, the process of firing the laminate comprising the semiconductor ceramic layers 2 and the conductive paste for the internal electrodes to form the ceramic piece 4 and the process of forming the external electrodes 5 on both of the end-faces of the ceramic piece 4 are separately carried out. The conductive paste for formation of external electrodes may be applied on both of the end-faces of the laminate before the laminate is fired, and thereafter, the laminate and the conductive paste for the external electrodes may be fired in a reducing atmosphere at the same time. In this case, it is necessary to carry out the reoxidation after the laminate and the conductive paste for the external electrodes are fired at the same time.

Moreover, the external electrodes 5 may be formed so as to have plural layer. A first external electrode 5a containing nickel, which is the same component as that of the internal electrodes 3, is formed on a part of each of the side-faces of the ceramic piece 4 where the internal electrode 3 is exposed and is to be connected directly to each external electrode 5, and a second electrode 5b containing silver as a major component is formed on the surface of the first external electrode 5a. With this structure, the electrical conduction between the ceramic piece 4 and the external electrodes 5 can be enhanced, and the bonding strength can be enhanced.

According to another method of forming the external electrodes 5, a metal of Cr, Cu, Ni, Ag, Au, Pt or the like, or an alloy of them, may be sputtered after the ceramic piece 4 is reoxidized. In this case, as seen in the above-description, the reoxidation is separately carried out.

Moreover, a glass coat layer 6 or the like as an inorganic insulating layer may be formed on the surface of the ceramic piece 4 before the external electrodes 5 are formed, and specifically, on the part of the surface thereof where no external electrodes 5 are to be formed. With the glass coat layer 6 provided, a plating layer, which will be formed later, can be prevented from being formed on the surface of the ceramic piece 4.

3. Third Process

Subsequently, the ceramic piece 4 having the external electrodes 5 formed thereon is heat-treated at a temperature between about 60° C. and 200° C. Preferably, the heat treatment is carried out at a temperature between about 80° C. and 150° C. If the temperature for the heat treatment is about 60° C. or lower, the advantages of this invention can not be sufficiently obtained, due to the excessively low heat treatment temperature, as will be described below in detail. On the other hand, if the heat treatment temperature is higher than 200° C., the internal electrodes 3 are oxidized. Thus, the room temperature resistance is increased, and the time-dependent change ratio is increased. Preferably, this heat treatment is carried out in an oxidizing atmosphere (preferably, in air), and the heat treatment time of about 5 to 200 hours is preferable.

After the third process, the produced ceramic piece 4 may be dipped in a plating bath so that a plating layer is formed. Preferably, an Ni plating layer 7 and an Sn plating layer 8 are formed in that order. However, these layers may be changed depending on the compatibility thereof with metal powder contained in the external electrodes 5. Solder-plating or the like may be employed instead of the above-described plating layers.

EXAMPLE

Hereinafter, the method of producing a laminated PTC thermistor is more specifically described with reference to Example.

First, $BaCO_3$, $TiO_2$ and $Sm_2O_3$ as starting materials for the ceramic powder to form the ceramic green sheets were prepared, and were mixed so as to satisfy the following formula:

$$(Ba_{0.9998}Sm_{0.0002})TiO_3$$

Subsequently, refined water was added to the mixed ceramic powder, and the combination was mixed with zirconia balls for 16 hours to be crushed, and was dried.

Thereafter, the dried powder was calcined at a temperature of 1000° C. to 1200° C. for 2 hours. An organic binder, a dispersant and water were added to the calcined powder, and mixed with zirconia balls for several hours. Thus, ceramic slurry was prepared. The slurry was formed into sheets by a doctor blade method, and dried to obtain a ceramic green sheet.

Ni electrode paste was coated onto the main surface of the ceramic green sheet in a desired pattern by a screen-printing. Thereafter, the ceramic green sheets were overlaid on each other in such a manner that the Ni electrode pastes were opposed to each other with the respective ceramic green sheets there between. Moreover, ceramic green sheets for protection having no Ni electrode paste applied thereto were placed on the upper and lower sides of the overlaid sheet material. The stack was press-bonded. The bonded sheet material was cut to green chips in such a size that the finished product made from each green chip would have a size of 2.0 mm in length×1.2 mm in width×0.9 mm in thickness. The formed green chip was dry-barrel-polished so that the corners and ridges of the green chip were rounded. In this case, the Ni electrode pastes were exposed on both of the end-faces of the green chip. Ni electrode pastes were coated onto both of the end-faces of the green chip so as to be connected to the exposed Ni electrode pastes, and were dried. The green chip and the Ni electrode pastes were simultaneously fired in a reducing atmosphere containing $H_2/N_2$ at a ratio by percent of 3 at a temperature of 1200° C. to 1350° C. for 2 hours. Thereby, the ceramic piece 4 was produced in which the semiconductor ceramic layers 2 and the internal electrodes 3 were alternately laminated on each other, and the Ni external electrodes 5a were formed on both of the end-faces.

Subsequently, a glass paste was coated onto the surface of the ceramic piece 4 and baked at a temperature of 500° C. to 600° C. in an oxidizing atmosphere (the atmosphere). Thus, a glass coat layer 6 was formed on the surface of the ceramic piece 4. The baking of the glass paste also has a function of reoxidation-heat-treating the ceramic piece 4.

Next, a Ag conductive paste, prepared by dispersing Ag powder in an organic vehicle, was coated onto both of the end-faces of the ceramic piece 4 having the glass coat layer 6 formed thereon, dried, and baked at 800° C. Thus, the Ag external electrodes 5b were formed. Thereafter, the ceramic piece 4 having the Ag external electrodes 5b formed thereon was heat treated for 100 hours at the temperatures listed in Table 1. Thereafter, a Ni plating layer 7 and then a Sn plating layer 8 were formed on the surfaces of the Ag external electrodes 5b. Thus, laminated PTC thermistors 1 of Samples 1 to 12 were obtained. A laminated PTC thermistor was taken as Comparative Example in which the ceramic piece 4 having the Ag external electrodes 5b formed thereon was not heat-treated, and the Ni plating layer 7 and then the Sn plating layer 8 were formed on the surfaces of the Ag external electrodes 5b.

The following characteristics of Samples 1 to 12 and Comparative Example were evaluated. Table 1 shows the results.

Time-Dependent Change Ratio of Resistance at Room Temperature

First, five test-pieces of each of Samples 1 to 12 and the Comparative Example were prepared. The initial resistances of these laminated PTC thermistors 1 were measured in advance. Thereafter, a voltage of 6V was applied to the respective laminated PTC thermistors 1. Conduction tests for 98 hours, 263 hours, 507 hours and 1002 hours were carried out, and the resistances at room temperature were measured. For each sample, the percentage by which the resistance increased from the initial resistance at room temperature was taken as a time-dependent change ratio of the resistance at room temperature.

TABLE 1

| Sample number | Heat treatment temperature (° C.) | Time-dependent change ratio (%) | | | |
|---|---|---|---|---|---|
| | | At 98 h | At 263 h | At 507 h | At 1002 h |
| Comparative example | — | 11.3 | 18.3 | 25.2 | 27.9 |
| *1 | 40 | 7.2 | 10.9 | 14.0 | 15.8 |
| *2 | 55 | 6.8 | 9.9 | 11.6 | 13.1 |
| 3 | 60 | 4.5 | 6.8 | 8.3 | 9.5 |
| 4 | 80 | 2.3 | 2.8 | 3.2 | 3.6 |
| 5 | 100 | 1.4 | 2.0 | 2.2 | 2.6 |
| 6 | 125 | 1.9 | 2.4 | 2.8 | 3.4 |
| 7 | 150 | 2.4 | 3.7 | 3.9 | 4.4 |
| 8 | 160 | 3.1 | 4.3 | 5.1 | 5.3 |
| 9 | 175 | 3.3 | 5.0 | 5.6 | 6.4 |
| 10 | 200 | 3.5 | 5.3 | 6.8 | 8.0 |
| *11 | 205 | 5.7 | 12.2 | 14.4 | 18.3 |
| *12 | 300 | 15.8 | 25.3 | 32.3 | 42.3 |

The mark * represents a sample departing from the scope of this invention.

For Samples 3 to 10 in Table 1, the time-dependent change ratios of room temperature resistance obtained after the conduction time of 98 hours are small, i.e., less than 5% for Samples 3 to 10. Moreover, the time-dependent change ratios of the resistance at room temperature obtained by the 98 to 1002 hour conduction test, are also small. Especially, for Samples 4 to 7 of which the heat treatment temperature is in the range of 80° C. to 150° C., the time-dependent change ratios of resistance at room temperature are very small, i.e., are less than 3% determined by the 98 hour conduction test, and are less than 5% determined by the 1002 hour conduction test. Thus, the time-dependent change ratios are considerably reduced. On the other hand, for Samples 1, 2, 11, and 12, the time-dependent change ratios of resistance at room temperature are high, i.e., more than 5% for the 98 hour conduction and more than 10% for the 1002 hour conduction. Especially for Sample 12, it is supposed that the high time-dependent change-ratio is due to the oxidization of the internal electrodes 3 of the laminated PTC thermistor, which is caused by the heat treatment temperature at the high temperature. For the Comparative Example, the time-dependent change-ratio is high, i.e., higher than 20%.

What is claimed is:

1. A method of producing a laminated PTC thermistor comprising;
   providing a sintered ceramic piece comprising a plurality of semiconductor ceramic layers with a positive resistance-temperature characteristic and at least two physically separated internal electrodes therein, said sintered ceramic piece having external electrodes on end-faces of the sintered ceramic piece; and
   heat-treating the sintered ceramic piece having the external electrodes thereon at a temperature between about 60° C. and 200° C. for about 5 to 200 hours.

2. The method of producing a laminated PTC thermistor according to claim 1, wherein the sintered ceramic piece having the external electrodes thereon is heat-treated at a temperature between about 80° C. and 150° C.

3. The method of producing a laminated PTC thermistor according to claim 2, wherein the external electrodes are multilayer electrodes.

4. The method of producing a laminated PTC thermistor according to claim 3, wherein the internal electrodes comprised a base metal and the layer of the multilayer external electrodes comprise the same base metal.

5. The method of producing a laminated PTC thermistor according to claim 4, wherein the base metal comprises Ni.

6. The method of producing a laminated PTC thermistor according to claim 5, wherein the layer of the multilayer external electrodes adjacent the Ni-containing layer comprises silver.

7. The method of producing a laminated PTC thermistor according to claim 1, wherein the external electrodes are multilayer electrodes.

8. The method of producing a laminated PTC thermistor according to claim 7, wherein the internal electrodes comprised a base metal and the layer of the multilayer external electrodes comprise the same base metal.

9. The method of producing a laminated PTC thermistor according to claim 8, wherein the base metal comprises Ni.

10. The method of producing a laminated PTC thermistor according to claim 9, wherein the layer of the multilayer external electrodes adjacent the Ni-containing layer comprises silver.

11. A method of a laminated PTC thermistor comprising
providing a sintered ceramic piece comprising a plurality of semiconductor ceramic layers with a positive resistance-temperature characteristic and at least two physically separated internal electrodes therein,
forming external electrodes on end-faces of the sintered ceramic piece, and
heat-treating the sintered ceramic piece having the external electrodes thereon at a temperature between about 60° C. and 200° C. for about 5 to 200 hours.

12. The method of producing a laminated PTC thermistor according to claim 11, further comprising forming a sintered ceramic piece comprising a plurality of semiconductor ceramic layers with a positive resistance-temperature characteristic and at least two physically separated internal electrodes therein.

13. The method of producing a laminated PTC thermistor according to claim 12, wherein the sintered ceramic piece having the external electrodes thereon is heat-treated at a temperature between about 80° C. and 150° C.

14. The method of producing a laminated PTC thermistor according to claim 11, wherein the sintered ceramic piece having the external electrodes thereon is heat-treated at a temperature between about 80° C. and 150° C.

* * * * *